(12) United States Patent
Funane

(10) Patent No.: US 11,245,598 B2
(45) Date of Patent: Feb. 8, 2022

(54) DEVICE MANAGEMENT SYSTEM AND METHOD

(71) Applicant: CANON KABUSHIKI KAISHA, Tokyo (JP)

(72) Inventor: Nao Funane, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/400,781

(22) Filed: May 1, 2019

(65) Prior Publication Data

US 2019/0349270 A1 Nov. 14, 2019

(30) Foreign Application Priority Data

May 14, 2018 (JP) .............................. JP2018-093275

(51) Int. Cl.
*H04L 12/24* (2006.01)

(52) U.S. Cl.
CPC ................................ *H04L 41/5058* (2013.01)

(58) Field of Classification Search
CPC ............................ H04L 41/5058; H04L 63/00
See application file for complete search history.

(56) References Cited

U.S. PATENT DOCUMENTS

| | | | | | |
|---|---|---|---|---|---|
| 2011/0295992 A1* | 12/2011 | Lee | ..................... | H04L 12/2889 | 709/223 |
| 2014/0104638 A1* | 4/2014 | Kato | ....................... | H04N 1/44 | 358/1.14 |
| 2014/0298483 A1* | 10/2014 | Kato | ....................... | H04L 63/20 | 726/27 |
| 2015/0120784 A1* | 4/2015 | Satoh | ..................... | G06F 21/105 | 707/802 |
| 2015/0128231 A1* | 5/2015 | Nakajima | ................ | G06F 21/45 | 726/5 |
| 2015/0281332 A1* | 10/2015 | Naito | .................. | G06Q 30/0645 | 709/217 |

(Continued)

FOREIGN PATENT DOCUMENTS

JP 2013182436 A 9/2013

*Primary Examiner* — Jonathan A Bui
*Assistant Examiner* — Zonghua Du
(74) *Attorney, Agent, or Firm* — Canon U.S.A., Inc. I.P. Division

(57) ABSTRACT

A system manages information about, and used in services provided to, a network device belonging to a customer. The system creates a first customer tenant in a tenant management service of a tenant for a first customer, registers identification information about a network device belonging to the first customer to the first customer tenant, and issues registration completion to a service system that provides the services. The system receives a registration request, creates a second customer tenant managing a network device belonging to a second customer, and registers identification information about the network device to the second customer tenant. The system causes the tenant management service to register a new tenant for the network device that transmitted the registration request and identification information about the transmitting network device, and issues a completion event to the service system in response to a notifying reply, from the tenant management service, indicating completion.

5 Claims, 7 Drawing Sheets

(56) References Cited

U.S. PATENT DOCUMENTS

| | | | |
|---|---|---|---|
| 2015/0304446 A1* | 10/2015 | Kato | H04L 67/2842 |
| | | | 709/223 |
| 2015/0319103 A1* | 11/2015 | Das | H04L 12/6418 |
| | | | 709/225 |
| 2015/0370847 A1* | 12/2015 | Kondoh | G06F 17/40 |
| | | | 707/691 |
| 2016/0359928 A1* | 12/2016 | Lee | H04L 65/1073 |
| 2018/0268124 A1* | 9/2018 | Ohzaki | G06F 21/10 |
| 2019/0188362 A1* | 6/2019 | Uchibori | G06F 3/1232 |

\* cited by examiner

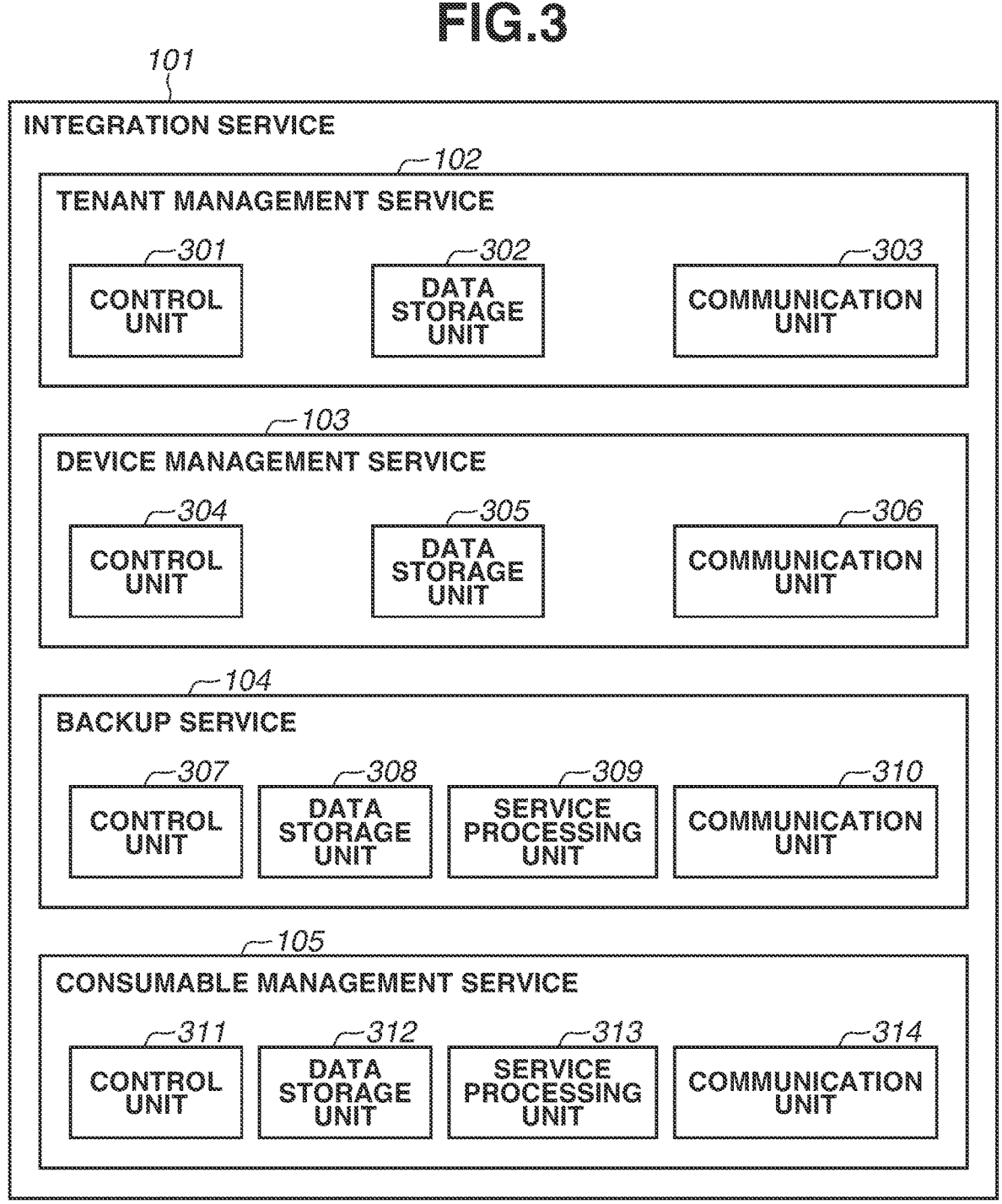

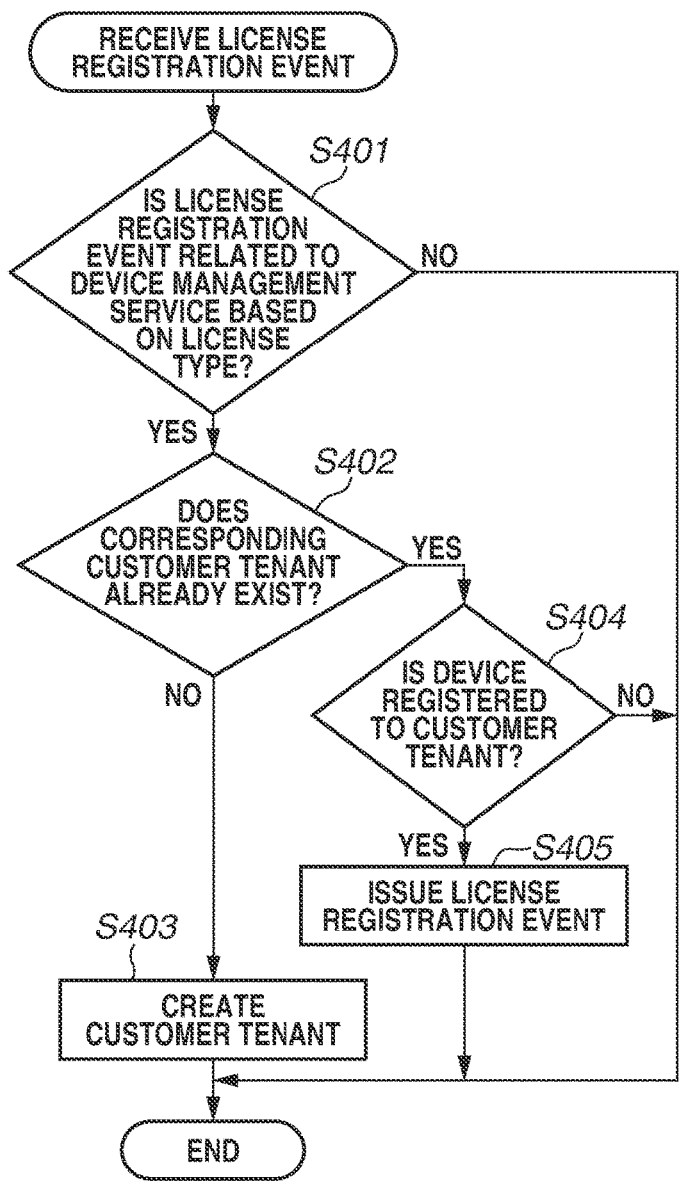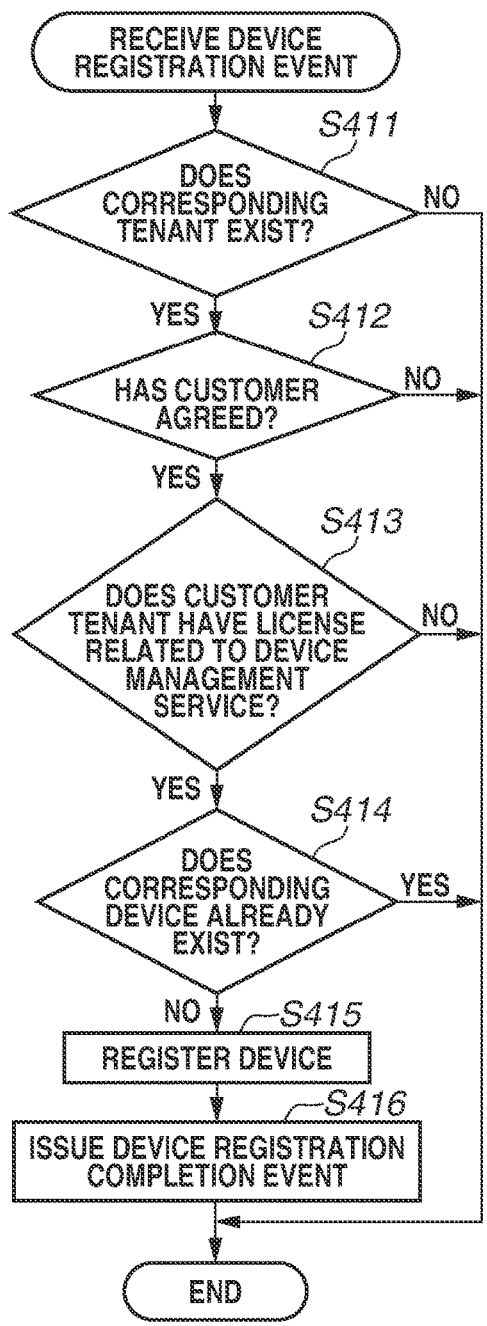

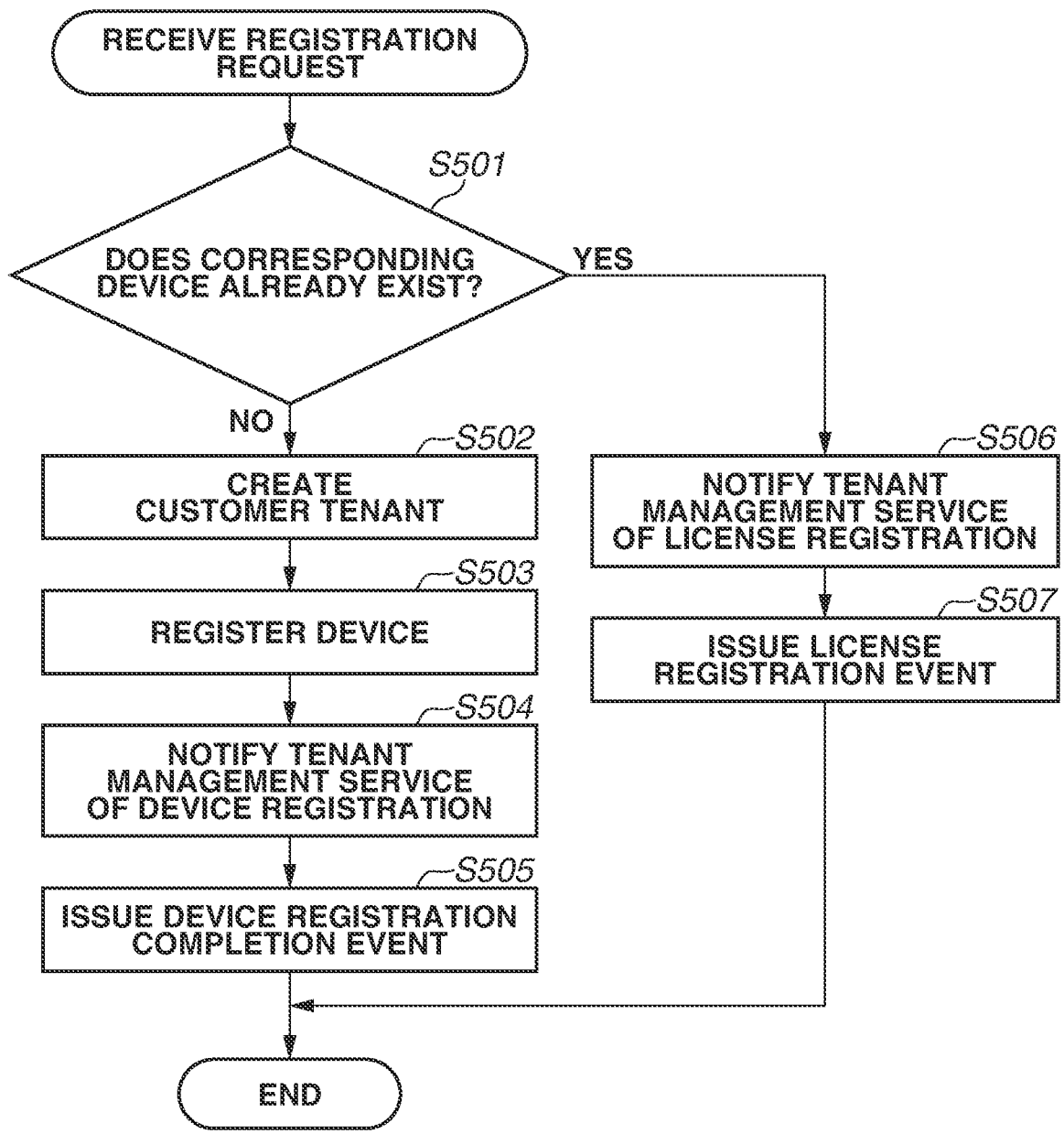

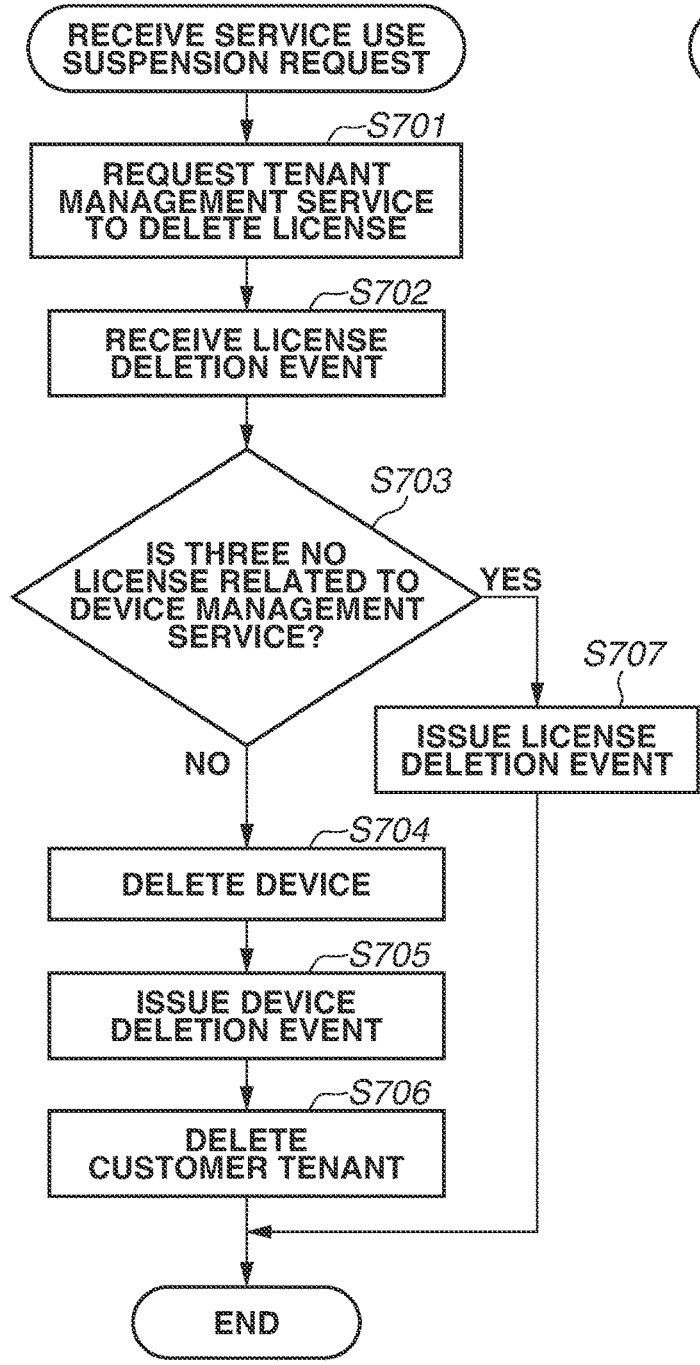
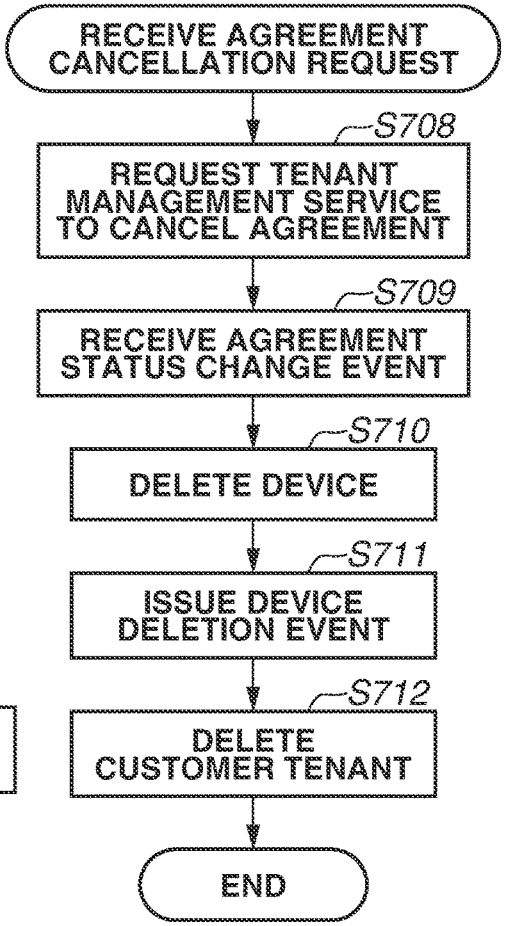

DEVICE MANAGEMENT SYSTEM AND METHOD

BACKGROUND OF THE INVENTION

Field of the Invention

The present disclosure relates to a device management technique in a system for supporting service provision to network devices of various users.

Description of the Related Art

In general, there are various services such as data backup service, consumable management and ordering service, and usage result collection and reporting service, for management of network devices connected to a network such as image processing apparatuses such as a scanner, a multi-function machine, and a three-dimensional (3D) printer, and home electric appliances.

These services may be provided as a cloud service system. In a cloud service system, typically, data storage and user information are managed in a unit of tenant, which is a dedicated area for each service user on a system.

The tenants include, for example, a customer tenant for a customer who is a company owning a network device, and a service provider (SP) tenant (may be referred to as an SP tenant) that is in charge of a management service of the network device for a customer. As a device management method for a company, a method is generally used in which a service provider sells or rents a plurality of network devices to the company, registers and manages information on the network devices in a customer tenant of the company prepared under the control of the SP tenant, and then provides a service.

Since data is separated for tenants, a user such as a service provider or a customer administrator typically has an access to only data within the tenant of the user and does not have an access to data within other tenants. However, in order for a service provider who is a trustee of a customer to provide a service related to a network device to the customer, the service provider needs to access data on the customer and the network device in the customer tenant.

Japanese Patent Application Laid-Open No. 2013-182436 proposes a method in which a service provider requests a customer for an access permission, and the customer approves the request, thereby allowing the service provider to access data in the customer tenant.

Here, the network device user may be an individual user having one network device in addition to a company having a plurality of network devices. It is required to provide various services related to device management to such users. An individual user as a customer typically purchases and uses a network device at a mass retailer or the like without intermediation of a service provider.

The above-described Japanese Patent Application Laid-Open No. 2013-182436 assumes that customer tenants are prepared under the control of an SP tenant, and does not assume collective management of companies as customers having contracts with a service provider and individual customers. Thus, it is not considered, in the document, how to prepare a customer tenant of an individual customer who does not have a contract with the service provider. However, it would be beneficial to operation of a device management system to structure a mechanism that allows device management on a unified management basis independent of the type of a customer, such as an individual user or a company customer, considering the subsequent expandability (including addition of services to be provided).

SUMMARY OF THE INVENTION

According to an aspect of the present disclosure, a device management system to manage information about a network device belonging to a customer, where the information is used in one or more services provided to the network device, includes one or more processors, and a memory storing instructions that, when executed by the one or more processors, cause the device management system to perform operations including: creating a first customer tenant in response to reception of a license registration event issued by a tenant management service based on registration, in the tenant management service, of a tenant for a first customer in response to an instruction from a service provider and a license to be provided to a network device belonging to the first customer, registering, in response to reception of a device registration event issued by the tenant management service and in a case where the first customer, to which the network device belongs and the service is provided through the service provider, has agreed to processing necessary to use the service, identification information about the network device belonging to the first customer to the created first customer tenant, issuing, in a case where the identification information about the network device belonging to the first customer is registered to the first customer tenant, a device registration completion event to a system that provides the one or more services, receiving a registration request from a network device belonging to a second customer, creating in response to the registration request, a second customer tenant managing the network device belonging to the second customer, registering identification information about the network device that is a transmission source of the registration request to the created second customer tenant, notifying the tenant management service of a registration event to cause the tenant management service to register a new tenant for the network device that is a transmission source of the registration request and identification information about the transmission source network device, and issuing a device registration completion event to the system that provides the one or more services in response to a notifying reply, from the tenant management service, indicating completion.

In a system for managing a company customer by using a service provider and a tenant of a customer, in response to a registration request from a network device owned by an individual user, a second customer tenant for managing a network device owned by the customer is created, identification information about the network device is registered, a tenant management service is notified of a registration event, and a device registration completion event is issued to a system that provides one or more services. Further features of the present invention will become apparent from the following description of embodiments with reference to the attached drawings.

BRIEF DESCRIPTION OF THE DRAWINGS

FIG. 3 is a block diagram illustrating an example of a functional module configuration of an integration service.

FIGS. 4A and 4B are flowcharts illustrating tenant and device registration processing for a company customer in a device management service.

FIG. 5 is a flowchart illustrating tenant and device registration processing for an individual user in the device management service.

FIGS. 7A and 7B are flowcharts illustrating tenant and network device deletion processing for an individual user in the device management service.

DESCRIPTION OF THE EMBODIMENTS

Figure 1:
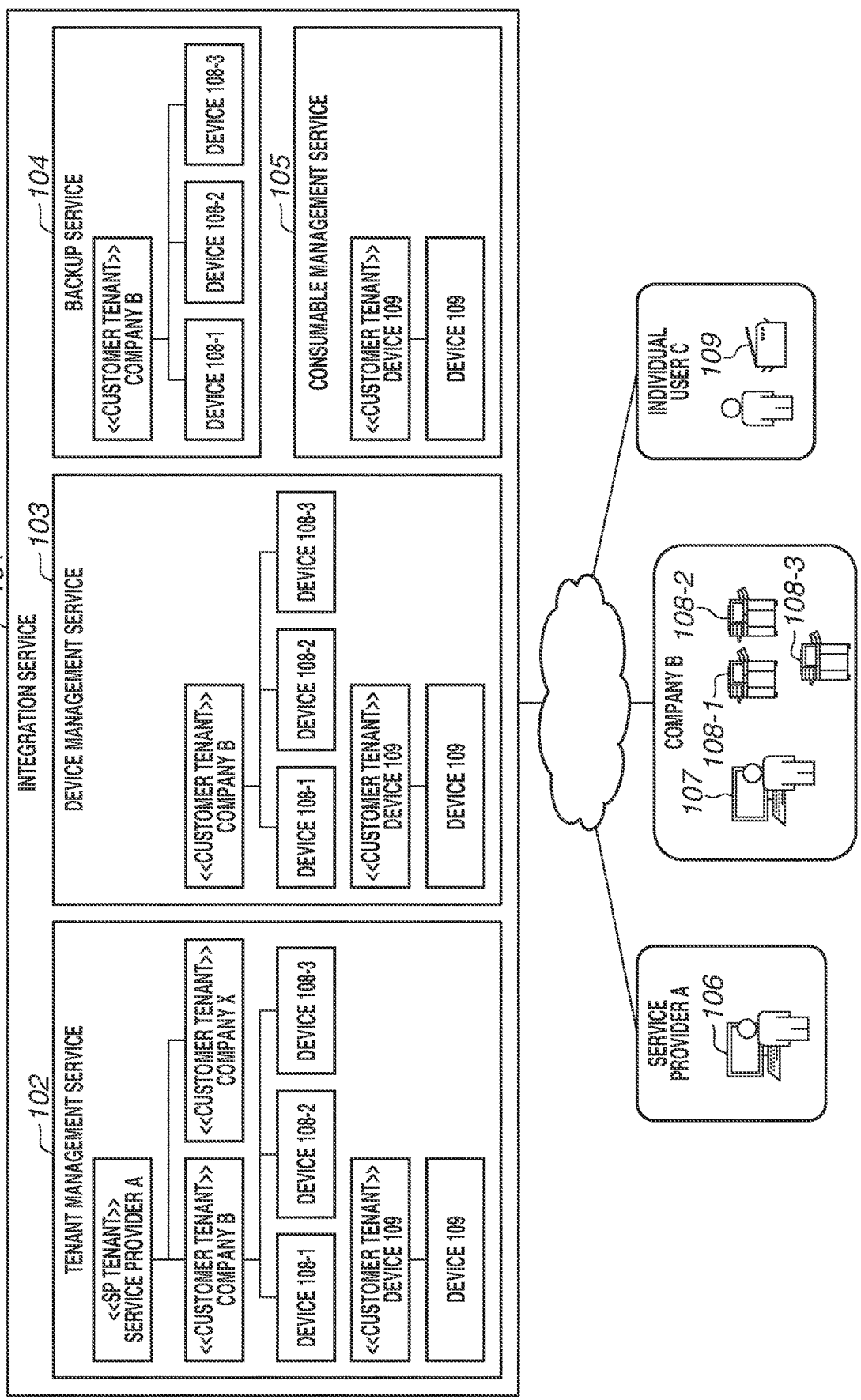
FIG. 1 is a diagram illustrating an example of the overall configuration of a network system according to an embodiment.

FIG. 1 is a diagram illustrating an example of the overall configuration of a network system according to the present embodiment.

An integration service 101 is a cloud service system that provides various services related to device management integrally.

A device management service (device management system) 103 is one system included in the integration service 101, and operates in cooperation with a tenant management service 102, a backup service 104, and a consumable management service 105. The device management service 103 manages identification information and the like of network devices that can be a target of service provision. The device management service 103 also has a function of communicating with the network devices via devices and applications that relay communications to acquire and manage configuration information, usage results, and consumable information.

The backup service 104 is a system having a function of storing applications, setting values of each application, and the like stored in a storage included in each network device, in a storage service on the cloud, and managing the applications, setting values, and the like. The backup service 104 provides a service of restoring backup data to a target network device when any trouble occurs in a storage of the network device.

The consumable management service 105 is a system having a function of collecting and monitoring consumable information about network devices, and automatically sending necessary consumables to a customer based on predetermined conditions.

For example, if a network device is a copier or a three-dimensional (3D) printer, the consumable management service 105 can send consumables such as toner or molding materials automatically to a customer site at an appropriate timing by monitoring the amount of consumable materials used by the device and comparing the amount with a threshold value.

In the present embodiment, the backup service 104 and the consumable management service 105 are described as examples of services to be provided to customers, but the service may be, for example, a usage result collection and reporting service. In addition, a new service can be added to the integration service 101. These various services realize a function of providing a service to a customer by analyzing data acquired by the device management service 103 through communication with network devices.

The tenant management service 102 is a system that manages service provider (SP) tenants and customer tenants. The tenant management service 102 has a function of managing the license statuses of various services including the backup service 104 and the consumable management service 105 and the service use agreement statuses with target customers, and provides a user interface through a dedicated website or an application programming interface (API) that can be used externally, for updating these statuses, for customer tenants.

A service provider A is an environment to which a user who uses various services such as the backup service 104 for a customer that is, for example, a company belongs. The service provider A uses the integration service 101 under the authority of the service provider. A computer 106 operated by a person in charge of the service provider A has a web browser, and the person can browse websites provided by the tenant management service 102 and the backup service 104 under the authority of the service provider.

A company B is a customer environment having one or more network devices and receiving services related to the network devices from various services such as the backup service 104. FIG. 1 illustrates an example in which the company B, which is treated as a customer on the device management service 103, has network devices 108-1 to 108-3. In the following description, the network devices 108-1 to 108-3 may also be collectively referred to as a network device 108. A computer 107 operated by a customer administrator of the company B has a web browser, and the customer administrator can browse websites provided by the tenant management service 102 under the authority of the customer.

An individual user C is a customer who receives services related to a network device, including related services such as the consumable management service 105. The individual user C may own or hold an interest in one network device 109, or have at least one of a partial or full claim to, authority over, power over, or dominion over the one network device 109. The one network device 109 may belong to or be held by the individual user C.

In the embodiment, it is also assumed that there are a plurality of service providers, a plurality of companies as customers, and a plurality of individual users as customers.

Figure 2:
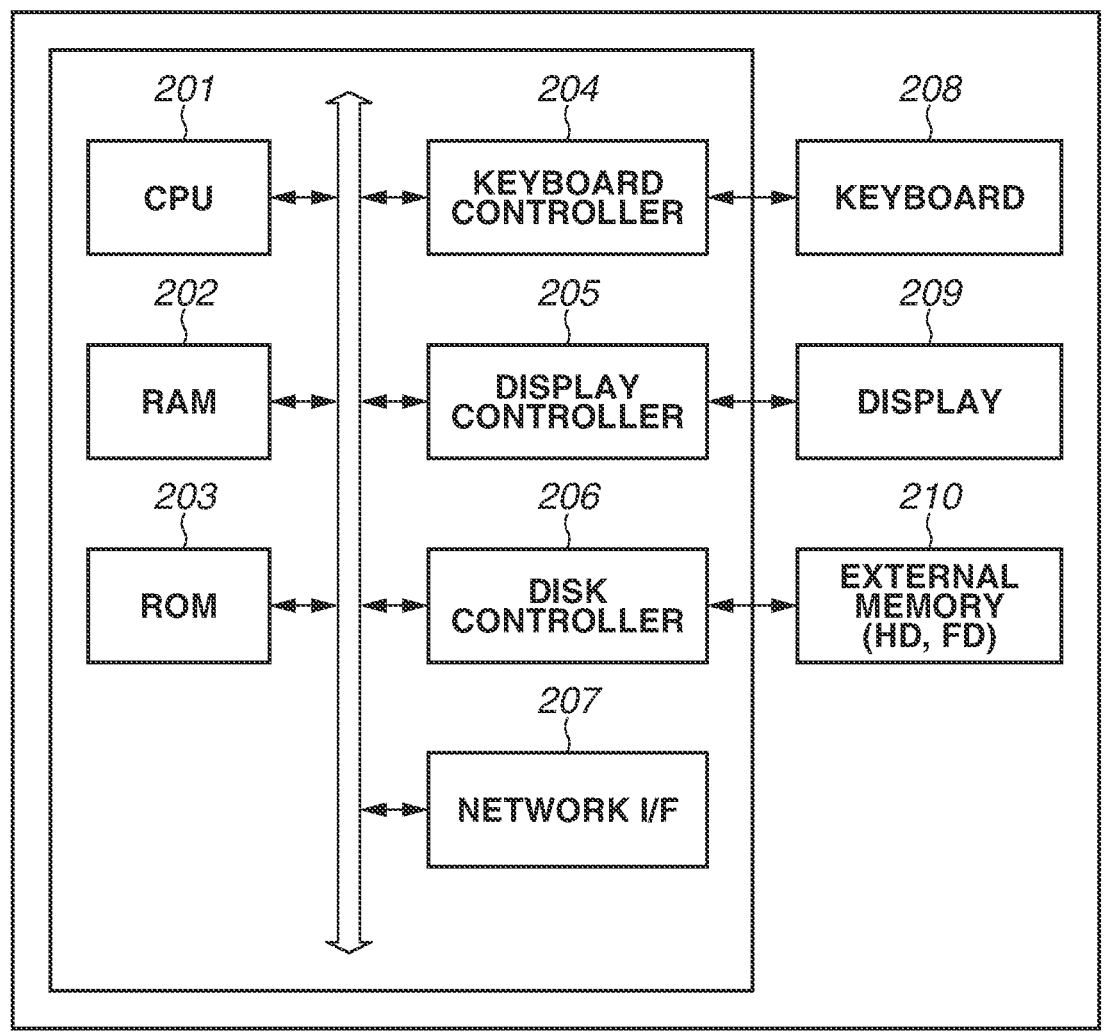
FIG. 2 is a block diagram illustrating a hardware configuration of an information processing apparatus.

FIG. 2 is a block diagram illustrating an example of the hardware configuration of an information processing apparatus for realizing the integration service 101, and information processing apparatuses illustrated as the computer 106 and the computer 107. The integration service 101 is realized using an application executed on a virtual machine running on one or more information processing apparatuses, a serverless application, a database service, and the like. To the virtual machine and the serverless application, hardware resources are appropriately allocated depending on a predetermined setting, a dynamic system load, and the like to realize processing to be described below. As to the components of the information processing apparatus, a part of the components to be described below such as a keyboard and a display is not necessary.

A central processing unit (CPU) 201 executes a program such as a program stored in a read only memory (ROM) 203, or an operating system (OS) or an application loaded from an external memory 210 into a random access memory (RAM) 202. That is, the CPU 201 functions as each processing unit that performs the processing of the corresponding flowchart described below by executing the program stored in a readable storage medium. The RAM 202 is a main memory of the CPU 201 and functions as a work area or the like.

A keyboard controller 204 controls operation inputs from a keyboard 208 and a pointing network device that is not illustrated (mouse, touchpad, touch panel, trackball, or the like). A display controller 205 controls display of a display 209. A disk controller 206 controls data access to the external memory 210 such as a hard disk (HD) or a flexible disk (FD) that stores various kinds of data. A network interface (I/F) 207 is connected to a network and performs communication control processing with other devices connected to the network.

FIG. 3 is a block diagram illustrating an example of a configuration of functional modules each of which is a main part of processing to be described below in each system in the integration service 101. The processing described below is realized by the CPU 201 loading a program corresponding to the processing into the RAM 202 and executing the program.

The tenant management service 102 includes a control unit 301, a data storage unit 302, and a communication unit 303. The control unit 301 is a module for performing processing such as tenant registration and deletion processing, and management of license statuses of various services and service use agreement statuses of customers. The data storage unit 302 is a module for managing data in a database on a storage such as a hard disk 210 or an online storage. The communication unit 303 is a module for controlling communication with an external system using the network I/F 207.

The device management service 103 includes a control unit 304, a data storage unit 305, and a communication unit 306. The control unit 304 is a module for performing control such as network device registration and deletion processing. The data storage unit 305 is a module for managing data in a database on a storage such as the hard disk 210 or an online storage. The communication unit 306 is a module for controlling communication with an external system using the network I/F 207.

The backup service 104 includes a control unit 307, a data storage unit 308, a service processing unit 309, and a communication unit 310. The control unit 307 is a module for controlling processing of various events received from the device management service 103 and the like. The data storage unit 308 is a module for managing data in a database on a storage such as the hard disk 210 or an online storage. The service processing unit 309 is a module for realizing a service for a customer such as backup processing and restore processing. The communication unit 310 is a module for controlling communication with an external system using the network I/F 207.

The consumable management service 105 includes a control unit 311, a data storage unit 312, a service processing unit 313, and a communication unit 314. The control unit 311 is a software module for controlling processing of various events received from the device management service 103 and the like. The data storage unit 312 is a module for managing data in a database on a storage such as the hard disk 210 or an online storage. The service processing unit 313 is a module for performing service provision processing to customers such as status management and order processing of consumables. The communication unit 314 is a module for controlling communication with an external system using the network I/F 207.

FIG. 4A is a flowchart for describing the customer tenant registration processing in the device management service 103 in a case where the customer is a company.

The customer tenant registration processing is described in a case where the service provider A sells the network device 108 to the company B, makes a contract for the backup service for the network device 108, and provides the service using the backup service 104 as an example. The service provider A is authorized to use the integration service 101 in advance and has its own SP tenant in the tenant management service 102. A person in charge of the service provider A operates the computer 106 to operate a website provided by the tenant management service 102 and instructs the tenant management service 102 to create a customer tenant of the company B. At the same time, the person in charge also makes instruction of license registration for the backup service.

In response to the customer tenant creation instruction via the website, the control unit 301 of the tenant management service 102 creates a customer tenant of the company B, and registers a license of the backup service for the customer tenant of the company B. Table A-1 is an example of a customer tenant status management table and is managed by the data storage unit 302. A license status and an agreement status described below are held for each customer tenant.

The license is set for each service and is held in a list in the customer tenant status management table. In this example, the data storage unit 302 holds that the company B has a license of the backup service.

TABLE A-1

| TENANT NAME | LICENSE | AGREEMENT |
| --- | --- | --- |
| COMPANY B | {BACKUP SERVICE} | {AGREEMENT 1: NOT AGREED, AGREEMENT 2: NOT AGREED} |

The tenant management service 102 issues to the device management service 103 an event indicating that license registration of the backup service has been made for the company B. At that time, information identifying the customer tenant and the license type is included in the event.

Upon receiving the license registration event, the device management service 103 starts the customer tenant registration processing illustrated in FIG. 4A.

In step S401, the control unit 304 determines whether the license registration event is related to the device management service 103 based on the license type. In the device management service 103, a list of license types related to the device management service 103 itself is managed in advance by the data storage unit 305. The determination in step S401 is made by checking the received license type and the license list. At this time, the license type identified based on the information included in the event issued by the tenant management service 102 indicates the backup service. Thus, the control unit 304 determines that the license registration event is related to the device management service 103 (Yes in step S401), and the processing proceeds to step S402.

Services that are not related to the device management service 103 include a form creating service. The form creating service is a service for creating a contractual document by registering formats of a contractual document or the like on the cloud in advance and creating the contractual document by adding data such as a name and date afterward, allowing download and print of the contractual document. Since such a service does not require device information and does not require registration of a network device, the service is not related to the device management service 103. If the control unit 304 determines that the service is not related to the device management service 103 based on the license type (No in step S401), the processing ends.

In step S402, the control unit 304 determines whether the customer tenant identified based on the information included in the received license registration event already exists in the customer tenant management table managed by the data storage unit 305. If the identified customer tenant does not exist in the customer tenant management table (No in step S402), the processing proceeds to step S403, and if the identified customer tenant exists in the customer tenant management table (Yes in step S402), the processing proceeds to step S404.

In step S403, the control unit 304 newly creates a customer tenant for the customer identified based on the information included in the received license registration event, and the data storage unit 305 stores and manages information related to the customer tenant in the customer tenant management table on the storage.

Table B-1 is an example of the customer tenant management table and holds information for identifying a customer tenant (tenant identification (ID)), a tenant type, and a list of network devices registered to the customer tenant as target devices. As the tenant type, a company or an individual user is registered. Here, the company indicates a customer for which a service is provided through the service provider. The individual user indicates a customer who receives services provided to one network device directly without intermediation of the service provider.

The information stored in the customer tenant management table stores customer tenant information included in the license registration event as the tenant name, and stores "COMPANY" as the tenant type. When a customer tenant is created from the license registration event, the tenant type is always "COMPANY". The tenant is registered with the management device empty because a device is not registered yet.

TABLE B-1

| TENANT NAME | TENANT TYPE | MANAGEMENT DEVICE |
|---|---|---|
| COMPANY B | COMPANY | |

In step S404, the control unit 304 determines whether a network device is registered to the customer tenant of the customer identified based on the information included in the received license registration event. If a network device is registered (Yes in step S404), the control unit 304 issues a license registration event in step S405, and the processing ends. If a network device is not registered (No in step S404), the processing ends.

The detailed processing in a case where the corresponding customer tenant already exists in the customer tenant management table will be described below.

FIG. 4B is a flowchart for describing the device registration processing in the device management service 103 in the case where the customer is a company.

The customer administrator of the company B operates the website provided by the tenant management service 102 via the computer 107 to make agreement related to service use. The service use agreement is made for each customer tenant, and may include agreement for collecting data (operation information, status, logs, etc.) of network devices handled by various services (backup service 104, consumable management service 105, etc.) provided by the integration service 101.

Upon receiving the agreement corresponding to the operation of the customer administrator, the control unit 301 of the tenant management service 102 changes the agreement status of the corresponding customer tenant in the customer tenant status management table to "AGREED". Here, the agreement type is set to "AGREEMENT 1", and the agreement status is changed from "NOT AGREED" to "AGREED". The agreement type will be described below.

When the network device 108 purchased by the company B is actually delivered to the company B, a person in charge of installing the network device performs the installation work. The person in charge of installation specifies information for identifying the customer tenant via the operation unit of the network device 108, and instructs the tenant management service 102 to register the device.

Based on the device registration instruction, the network device 108 communicates with the tenant management service 102 to request registration of the network device 108 itself. At that time, the request includes information such as a serial number for identifying the corresponding customer tenant and the network device.

When the communication unit 303 of the tenant management service 102 receives the communication from the network device 108, the data storage unit 302 stores the information about the network device 108 associated with the corresponding tenant, and issues a device registration event to the device management service 103. The device registration event includes information received from the network device 108.

The device registration processing illustrated in FIG. 4B is started in response to the reception of a device registration event by the device management service 103.

In step S411, the control unit 304 determines whether the customer tenant identified based on the information included in the device registration event exists in the customer tenant management table. If the customer tenant exists (Yes in step S411), the processing proceeds to step S412. If the customer tenant does not exist (No in step S411), the control unit 304 determines that the network device is not related to the device management service 103, and the processing ends.

In step S412, the control unit 304 checks whether the customer (target customer) corresponding to the customer tenant identified by the information included in the device registration event has agreed. As a method of checking whether the customer has agreed, the device management service 103 may query the tenant management service 102, or an agreement status may be included in the device registration event. If the target customer has agreed (Yes in step S412), the processing proceeds to step S413, and if the target customer has not agreed (No in step S412), the processing ends.

In step S413, the control unit 304 determines whether the customer tenant to which the network device (target device) identified based on the information included in the device registration event belongs has a license related to the device management service 103. As a method of checking whether the customer tenant has the license related to the device management service 103, the device management service 103 may query the tenant management service 102, or a license status may be included in the device registration event. If the customer tenant has a license related to the device management service 103 (Yes in step S413), the processing proceeds to step S414, and if the customer tenant does not have a license related to the device management service 103 (No in step S413), the processing ends.

In step S414, the control unit 304 determines whether the target device exists in the customer tenant management table. If the corresponding device does not exist in the customer tenant management table (No in step S414), the processing proceeds to step S415, and if the corresponding device already exists in the customer tenant management table (Yes in step S414), the processing ends.

In step S415, the data storage unit 305 registers the information about the corresponding device (network device 108) to the customer tenant of the target customer. As listed in Table B-2, the identification information of the network device 108 and the like are stored in the item "MANAGEMENT DEVICE" of the "COMPANY B" in the customer tenant management table.

TABLE B-2

| TENANT NAME | TENANT TYPE | MANAGEMENT DEVICE |
|---|---|---|
| COMPANY B | COMPANY | {NETWORK DEVICE 108-1, NETWORK DEVICE 108-2, NETWORK DEVICE 108-3} |

The device management service 103 has a device information management table for managing device information, and holds basic information of a network device commonly used by various services (backup service 104 and consumable management service 105). The basic information is basic information such as a serial number, a network device type, a product name, and an internet protocol (IP) address. The basic information may be included in the device registration event of the tenant management service 102 when the network device requests the tenant management service 102 to register the network device itself. Alternatively, the device management service 103 may receive only information for identifying a network device such as a serial number and information for communicating with the network device such as an IP address from the tenant management service 102, and the device management service 103 may communicate with the network device 108 through the communication unit 306 and acquire information from the network device 108.

In step S416, the control unit 304 issues a device registration completion event and the processing ends. At this time, information for identifying the customer tenant and the network device, information for identifying the license type held by the customer tenant, and an agreement status are included in the completion event.

The various services (backup service 104 and consumable management service 105) manage information about a network device to be a service provision target as management device information in the database for each service. For example, upon receiving the device registration completion event issued by the device management service 103, the backup service 104 checks the license type. If the registered network device is related to the backup service 104 itself, the backup service 104 adds the information about the network device to the database as management device information. If the customer tenant already exists in the database, the backup service 104 registers information about the network device to the customer tenant, and if the customer tenant does not exist in the database, the backup service 104 creates a customer tenant at the same time. Further, when the service is the backup service 104, the backup schedule and the backup history are stored as service-specific information in addition to the basic information.

In this embodiment, the company B has the license of the backup service 104 only. Thus, the consumable management service 105 does not add the information about the network device 108 even if the device registration event related to the network device 108 is issued.

After performing the network device registration, the various services (backup service 104 and consumable management service 105) register the items necessary for providing the service and desired to be acquired from the network device in the device management service 103. The items registered at this time are determined considering the agreement status. The license status change processing will be described below.

Table C-1 is an example of an acquisition item management table held by the device management service 103, and is managed in a storage by the data storage unit 305. The acquisition item management table is a table for defining, for each management device, items to be acquired for that network device.

TABLE C-1

| MANAGEMENT DEVICE | SERVICE | ITEM |
|---|---|---|
| NETWORK DEVICE 108-1 | BACKUP | {APPLICATION SETTING VALUE} |
| NETWORK DEVICE 108-2 | BACKUP | {APPLICATION SETTING VALUE} |
| NETWORK DEVICE 108-3 | BACKUP | {APPLICATION SETTING VALUE} |
| NETWORK DEVICE 109 | CONSUMABLE MANAGEMENT | {TONER REMAINING AMOUNT, PAPER REMAINING AMOUNT} |

The backup service 104 is a service for acquiring applications stored in a storage area in a network device, setting values of each of the applications, and the like from the network device and backing them up. In Table C-1, the item to be acquired from the network device is "APPLICATION SETTING VALUE".

The consumable management service 105 is a service for automatically delivering consumables to a customer when the residual amount of the consumables becomes small. Here, it is assumed that the network device 109 is a printer that uses toner for printing on paper. Therefore, the items to be acquired from the network device are "TONER REMAINING AMOUNT" and "PAPER REMAINING AMOUNT".

The device management service 103 updates the data of the acquisition item management table upon receiving a request related to an item to be acquired for each network device from various services (backup service 104 and consumable management service 105). The device management service 103 communicates with the network device to acquire data corresponding to items managed in the acquisition item management table, and stores the acquired data in the storage. Each of the various services (backup service 104 and consumable management service 105) uses the data acquired and stored by the device management service 103 to provide the corresponding service to the customer (or network device).

FIG. 5 is a flowchart for describing the customer tenant and device registration processing in the device management service 103 when the customer is an individual user.

The customer tenant and device registration processing is described in a case where the individual user C purchases the network device 109 and makes a contract for the consumable management service 105 with the network device 109 as an example. The individual user C performs an operation for agreeing to use the consumable management service 105 on the operation unit of the network device 109. Upon receiving the operation, the network device 109 communicates with the device management service 103 to request registration of information about the network device 109 itself.

In step S501, following the reception of the registration request from the network device, the control unit 304 searches the customer tenant management table to determine whether the network device already exists in the customer tenant management table. If the network device does not exist in the customer tenant management table (No in step S501), the processing proceeds to step S502, and if the network device exists (Yes in step S501), the processing proceeds to step S506.

In step S502, the control unit 304 newly creates a customer tenant for the network device 109, and the data storage unit 305 stores and manages information related to the created customer tenant in the customer tenant management table on the storage. When tenant creation and network device registration are performed in response to a request from a network device, the tenant type is always "INDIVIDUAL USER". Further, in step S503, the control unit 304 registers basic information such as identification information about the network device 109 as the transmission source of the registration request as the management device of the created customer tenant. That is, as listed in Table B-3, records of customer tenants and network devices are created in one-to-one correspondence.

TABLE B-3

| TENANT NAME | TENANT TYPE | MANAGEMENT DEVICE |
|---|---|---|
| COMPANY B | COMPANY | {NETWORK DEVICE 108-1, NETWORK DEVICE 108-2, NETWORK DEVICE 108-3} |
| NETWORK DEVICE 109 | INDIVIDUAL USER | {NETWORK DEVICE 109} |

In step S504, the control unit 304 notifies the tenant management service 102 of the registration event of the customer tenant and the network device.

Upon receiving the notification, the control unit 301 of the tenant management service 102 creates a new customer tenant as listed in Table A-2 in a case where there is no customer tenant for the network device 109. In the customer tenant status management table, the license of the consumable management service is registered to the customer tenant for the network device 109, and the agreement status is stored as "AGREED". The control unit 301 replies to device management service 103 that the registration processing is completed.

TABLE A-2

| TENANT NAME | LICENSE | AGREEMENT |
|---|---|---|
| COMPANY B | {BACKUP SERVICE} | {AGREEMENT 1: AGREED, AGREEMENT 2: NOT AGREED} |
| NETWORK DEVICE 109 | {CONSUMABLE MANAGEMENT SERVICE} | {AGREEMENT 1: AGREED, AGREEMENT 2: NOT AGREED} |

In step S505, upon receiving the reply indicating completion of processing such as tenant registration processing from the tenant management service 102, the control unit 304 of the device management service 103 issues a device registration completion event and the processing ends. Upon receiving the device registration completion event, the consumable management service 105 performs processing similar to the processing performed by the backup service 104 upon receiving the device registration event when the customer is a company. More specifically, the customer tenant for the network device 109 and the network device 109 are registered to the consumable management service 105.

In step S506, the control unit 304 of the device management service 103 determines that the service is added to an existing network device, and notifies the tenant management service 102 of the license registration. Upon receiving the notification, the control unit 301 of the tenant management service 102 registers the license of the consumable management service 105 to the customer tenant for the network device 109 in the customer tenant status management table, and replies the processing result to the device management service 103.

In step S507, upon receiving the completion of the license registration, the control unit 304 of the device management service 103 issues a license registration completion event and the processing ends.

The state of the tenant created in the processing of FIGS. 4A-5 and managed by each service is illustrated in FIG. 1. Specifically, in the tenant management service 102, the SP tenant of the service provider A is created, and the customer tenant of the company B is created under the SP tenant. In addition, in the customer tenant of company B, data related to the device 108 is managed. The licenses and agreement statuses are managed in association with the customer tenant of company B. In addition, in the tenant management service 102, the customer tenant for the network device 109 is created directly without an SP tenant. In the customer tenant, data related to the network device 109 is managed. In the customer tenant for the network device 109, the agreement status by the individual user C is managed.

In the device management service 103, the customer tenant of the company B is created as illustrated in FIG. 1, and data related to the network device 108 is managed. In addition, the customer tenant for the network device 109 is created, and data related to the network device 109 is managed. The device management service 103 does not manage the agreement status of each customer.

In the backup service 104, the customer tenant of the company B is created, and data related to the network device 108 is managed. In the consumable management service 105, the customer tenant for the network device 109 is created, and data related to the network device 109 is managed.

Next, processing when the license status or the agreement status is updated will be described again with reference to the flowchart of FIG. 4A. A license registration event is issued by the tenant management service 102 not only when a contract is made with a new customer, but also when an existing customer makes a contract for an additional service. Here, an example in which the company B having a contract for the backup service additionally makes a contract for a usage result totaling service will be described.

A person in charge of the service provider A operates the computer 106 to operate the website provided by the tenant management service 102 and instruct the tenant management service 102 to register a license of the usage result totaling service for the company B. In response to the license registration instruction, the control unit 301 of the tenant management service 102 registers a license for the usage result totaling service for the customer tenant of the company B. The tenant management service 102 issues to the device management service 103 an event indicating that license registration of the usage result totaling service has been made for the company B.

The processing in steps 401 to 402 performed by the device management service 103 upon receiving the license registration event is as described above. In this example, in step S402, the control unit 304 determines that the corresponding customer tenant already exists (Yes in step S402). In that case, if there is a network device managed in the existing customer tenant, the device management service 103 needs to additionally acquire data required by the additional service from the network device. Therefore, in step S404, the device management service 103 determines whether a network device is registered to the corresponding customer tenant, and if the network device is registered (Yes in step S404), the device management service 103 issues a license registration event in step S405. The license registration event includes a license type.

Prior to step S404, the device management service 103 acquires a network device list of the corresponding customer from the tenant management service 102. This is performed considering a case where there is a network device that has not been registered in step S413 of FIG. 4B.

When the number of network devices to be managed increases due to the license registration, the device management service 103 issues a device registration event to each service.

Upon receiving the license registration event issued by the device management service 103, the usage result totaling service (not illustrated) checks the license type. If the license is for the usage result totaling service itself, the usage result totaling service requests the device management service 103 to additionally register items, which are necessary for service provision, to the network device of the corresponding customer.

Here, processing considering the content of the agreement is necessary.

As described above, the tenant management service 102 holds the agreement status of the customer in the customer tenant status management table that is Table A. The content of the agreement related to service use usually presents necessary and sufficient conditions. For example, if the target of the backup service 104 is assumed to be the setting value of each application as described above, data to be acquired does not include confidential information such as personal information. From customers who receive only the backup service, agreement for acquiring personal information is not needed, but only agreement for acquiring data related to network devices is needed. Therefore, a written agreement to that effect should be provided.

On the other hand, the usage result totaling service requires counter information and job history information. As a service content, the usage result totaling service provides a service for reporting a totaling result of the number of sheets to be printed using counter information. In addition, by acquiring the job history, the usage result totaling service can total the number of sheets to be printed for each user who has executed printing. Since the job history includes user information, agreement for acquiring the personal information is needed when a service using the job history is provided. Thus, the required agreement may differ depending on services to be provided.

Agreement that does not include agreement for personal information acquisition is defined as "AGREEMENT 1" in the customer tenant status management table. Agreement related to personal information is defined as "AGREEMENT 2".

If the company B has a contract only for the backup service, the agreement by the customer administrator of company B described above is of the type "AGREEMENT 1" which is an agreement to acquire data not including personal information. Thus, the job history cannot be acquired in the current agreement status. Therefore, the usage result totaling service that has received the license registration event issued in step S405 requests the device management service 103 to acquire the counter information that can be acquired from the network device 108 in the current agreement status. Table C-2 is the acquisition item management table in a state resulting from the above-described processing.

TABLE C-2

| MANAGEMENT DEVICE | SERVICE | ITEM |
| --- | --- | --- |
| NETWORK DEVICE 108-1 | BACKUP | {APPLICATION SETTING VALUE} |
| NETWORK DEVICE 108-1 | USAGE RESULT TOTALING | {COUNTER} |
| NETWORK DEVICE 108-2 | BACKUP | {APPLICATION SETTING VALUE} |
| NETWORK DEVICE 108-2 | USAGE RESULT TOTALING | {COUNTER} |
| NETWORK DEVICE 108-3 | BACKUP | {APPLICATION SETTING VALUE} |
| NETWORK DEVICE 108-3 | USAGE RESULT TOTALING | {COUNTER} |

Thereafter, when the customer administrator of the company B operates the website provided by the tenant management service 102 from the computer 107 to agree personal information acquisition, the tenant management service 102 changes "AGREEMENT 2" of the customer to "AGREED" (Table A-3) and issues an agreement status update event.

TABLE A-3

| TENANT NAME | LICENSE | AGREEMENT |
| --- | --- | --- |
| COMPANY B | {BACKUP SERVICE} {USAGE RESULT TOTALING SERVICE} | {AGREEMENT 1: AGREED, AGREEMENT 2: AGREED} |
| NETWORK DEVICE 109 | {CONSUMABLE MANAGEMENT SERVICE} | {AGREEMENT 1: AGREED, AGREEMENT 2: NOT AGREED} |

Upon receiving the agreement status change event from the tenant management service 102, the device management service 103 acquires the network device list of the corresponding customer from the tenant management service 102 at the time of reception of a device registration event. This is performed considering a case where there is a network device that has not been registered because it has been in not-agreed status in step S412 in FIG. 4B. When the number of network devices to be managed increases due to the update of the agreement status, the device management service 103 issues a device registration event to each service. The device management service 103 issues an agreement status change event to each service.

Upon receiving the agreement status change event, the various services including the usage result totaling service determine whether it is necessary to change the item to be acquired from the network device due to the agreement status change. If it is determined to be necessary, the services request the device management service 103 to change the acquisition item. In the present embodiment, the usage result totaling service requests the device management service 103 to additionally acquire the job history of the network device of the company B.

Table C-3 is the acquisition item management table in a state resulting from the above-described processing.

TABLE C-3

| MANAGEMENT DEVICE | SERVICE | ITEM |
|---|---|---|
| NETWORK DEVICE 108-1 | BACKUP | {APPLICATION SETTING VALUE} |
| NETWORK DEVICE 108-1 | USAGE RESULT TOTALING | {COUNTER, JOB HISTORY} |
| NETWORK DEVICE 108-2 | BACKUP | {APPLICATION SETTING VALUE} |
| NETWORK DEVICE 108-2 | USAGE RESULT TOTALING | {COUNTER, JOB HISTORY} |
| NETWORK DEVICE 108-3 | BACKUP | {APPLICATION SETTING VALUE} |
| NETWORK DEVICE 108-3 | USAGE RESULT TOTALING | {COUNTER, JOB HISTORY} |

Next, with reference to flowcharts illustrated in FIGS. 6A and 6B, service suspension processing in the device management service 103 when the customer is a company will be described.

Figure 6A:
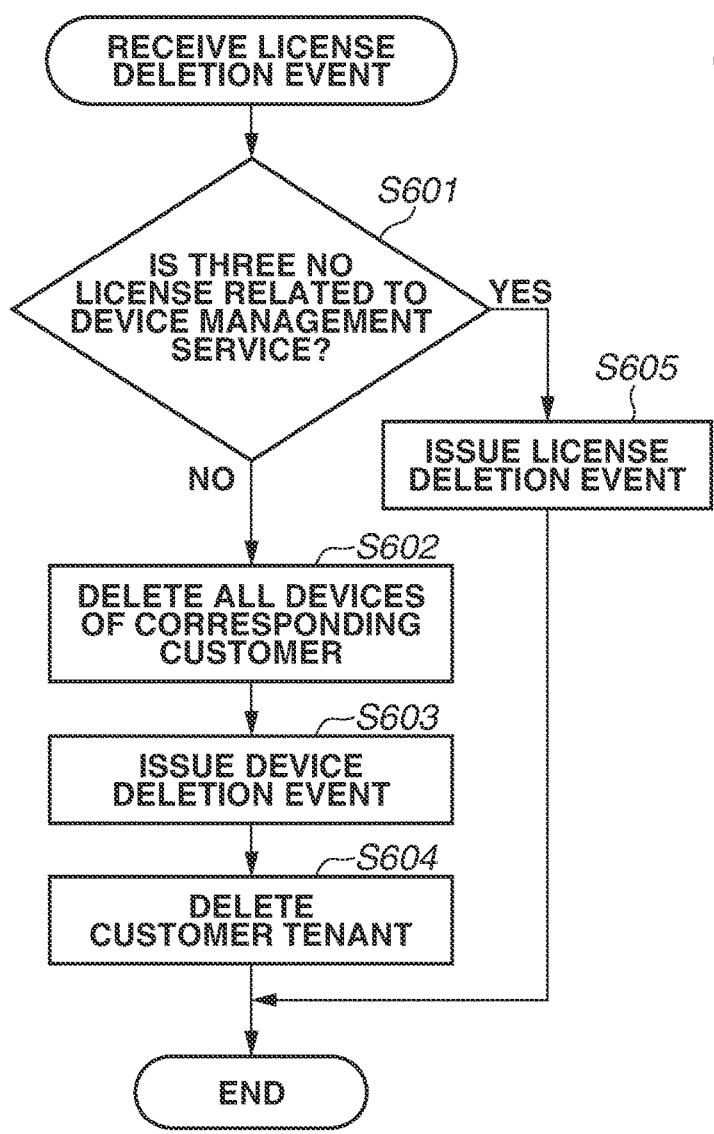
FIGS. 6A and 6B are flowcharts illustrating tenant and network device deletion processing for a company customer in the device management service.

FIG. 6A is processing in a case where a contract for a certain service is cancelled. Here, the processing is described in a case where the company B cancels the backup service as an example.

A person in charge of the service provider A operates the computer 106 to operate the website provided by the tenant management service 102 and instruct the tenant management service 102 to delete the license of the backup service for the company B. In response to the license deletion instruction, the control unit 301 of the tenant management service 102 deletes the backup service from "LICENSE" of the customer B in the customer tenant status management table (Table A-4). The tenant management service 102 issues an event indicating that the license of the backup service for the company B has been deleted. At that time, information identifying the customer tenant and the license type is included in the event.

TABLE A-4

| TENANT NAME | LICENSE | AGREEMENT |
|---|---|---|
| COMPANY B | {USAGE RESULT TOTALING SERVICE} | {AGREEMENT 1: AGREED, AGREEMENT 2: AGREED} |
| NETWORK DEVICE 109 | {CONSUMABLE MANAGEMENT SERVICE} | {AGREEMENT 1: AGREED, AGREEMENT 2: NOT AGREED} |

Following the reception of the license deletion event, the device management service 103 starts processing illustrated in FIG. 6A.

In step S601, the control unit 304 determines whether there is no license related to the device management service 103 in the licenses corresponding to the customer tenant identified based on the information included in the license deletion event. If the control unit 304 determines that there is no license (No in step S601), the processing proceeds to step S602, and if the control unit 304 determines that a license other than the license corresponding to the license deletion event remains (Yes in step S601), the processing proceeds to step S605.

License information held by customer B at that time may be included in the license deletion event issued by tenant management service 102, or the device management service 103 may query the tenant management service 102 with regard to the license information. If the company B has a contract for the usage result totaling service, the control unit 304 determines that contract of a license related to the device management service 103 remains even when the backup service is canceled.

In step S605, the control unit 304 issues a license deletion event to the various services and the processing ends. If the license type in the license deletion event is each of the various services itself that has received the license deletion event issued by the device management service 103, the service deletes information about the corresponding network device. Specifically, the backup service 104 deletes the information about the network device identified based on the information included in the license deletion event, from the management targets of the backup service 104 itself.

In step S602, the control unit 304 deletes all the data (registration information such as identification information) that are related to the network device 108 of the company B and that are held in the device management service 103, and in step S603, the control unit 304 issues a network device deletion event. In addition, in step S604, the control unit 304 deletes the customer tenant of the company B. When the backup service 104 receives the network device deletion event issued by the device management service 103, the backup service 104 deletes the information about the corresponding device managed as a management device of a service provision target of the backup service 104 itself.

Figure 6B:
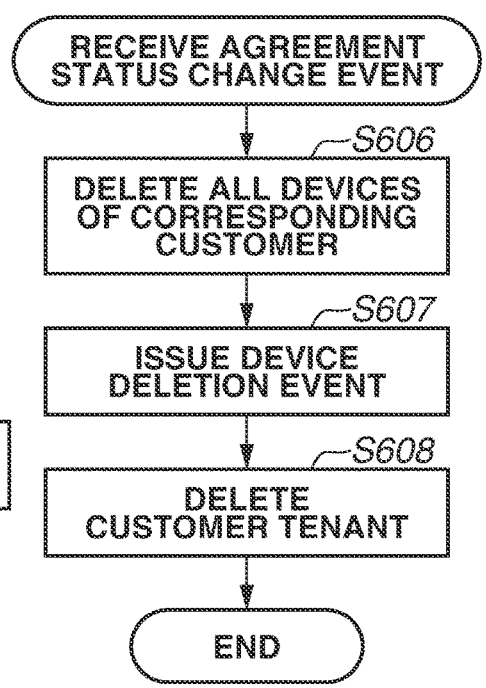

FIG. 6B illustrates processing in a case where a customer cancels an agreement. The customer administrator of the company B can cancel the agreement made to use the service by operating the website provided by the tenant management service 102 via the computer 107.

Upon receiving the operation of the agreement cancelation from a customer, the control unit 301 of the tenant management service 102 changes all the agreement statuses of the corresponding customer tenant in the customer tenant status management table to "NOT AGREED". Further, the control unit 301 issues an agreement status change event. At that time, information identifying the customer tenant is then included in the event.

Following the reception of the agreement status change event, the device management service 103 starts processing illustrated in FIG. 6B.

Upon receiving the agreement status change event in step S606, the data storage unit 305 deletes all of the data that are held in the data storage unit 305 and that are related to the network device of the customer tenant identified based on the information included in the event. In step S607, the control unit 304 issues a network device deletion event. In step S608, the data storage unit 305 deletes the customer tenant of the company B. Each of the various services (backup service 104 and consumable management service 105) having received the network device deletion event deletes the information about the corresponding device managed as a management device of a service provision target of the service itself.

It should be noted that with regard to the agreement cancellation only the agreement related to personal information acquisition ("AGREEMENT 2") may be canceled, for example. In this case, information about the canceled agreement type is included in the agreement status change event issued by the tenant management service 102. Upon receiving the agreement status change event indicating that the agreement related to personal information acquisition is canceled, the device management service 103 issues the same event to the various services. Upon receiving the agreement status change event related to "AGREEMENT 2", the usage result totaling service described above determines whether it is necessary to change the item to be acquired from the network device and whether it is necessary to delete device information, due to the agreement status change. In the case where the item to be acquired is changed, a change request is issued to the device management service 103.

Next, with reference to flowcharts illustrated in FIGS. 7A and 7B, service suspension processing in the device management service 103 when the customer is an individual user will be described.

FIG. 7A is a sequence in a case where a contract for a certain service is cancelled. The individual user C suspends the use of consumable management service 105 on the operation unit of the network device 109.

Upon receiving the operation of the use suspension, the network device 109 communicates with the device management service 103 to request service use suspension. The service use suspension request includes information for identifying a network device.

In step S701, in response to the service use suspension request, the communication unit 306 requests the tenant management service 102 to delete the license. The license deletion request includes information for identifying the network device and a license type.

The tenant management service 102 deletes the license of the consumable management service 105 for the customer tenant for the network device 109 and issues a license deletion event to the device management service 103.

In step S702, the communication unit 306 receives the license deletion event. In step S703, the control unit 304 determines whether there is no license related to the device management service 103 in the licenses corresponding to the target customer. If there is any other license (Yes in step S703), the processing proceeds to step S707, and if there is no license (No in step S703), the processing proceeds to step S704.

In step S707, the control unit 304 issues a license deletion event and the processing ends.

In step S704, the data storage unit 305 deletes all of the data that are held in the data storage unit 305 and that are related to the network device 109. In step S705, the control unit 304 issues a network device deletion event. In step S706, the data storage unit 305 deletes the customer tenant for the network device 109.

FIG. 7B is a sequence in a case where the customer cancels an agreement. The individual user C cancels all the service use agreements on the operation unit of the network device 109.

Upon receiving the agreement cancellation operation, the network device 109 communicates with the device management service 103 to request agreement cancellation. The agreement cancellation request includes information for identifying the network device.

In step S708, in response to the agreement cancellation request, the communication unit 306 requests the tenant management service 102 to cancel agreement. The agreement cancellation request includes information for identifying the network device and a license type.

Upon receiving the agreement cancellation request, the control unit 301 of the tenant management service 102 changes all of the agreement statuses of the corresponding customer tenant in the customer tenant status management table to "NOT AGREED". The control unit 301 issues an agreement status change event to the device management service 103. At that time, information identifying the customer tenant is then included in the event.

In step S709, the communication unit 306 receives an agreement status change event. In step S710, the data storage unit 305 deletes all the data that are held in the data storage unit 305 and that are related to the network device 109. In step S711, the control unit 304 issues a network device deletion event. In step S712, the data storage unit 305 deletes the customer tenant for the network device 109.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may include one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to embodiments, it is to be understood that the disclosure is not limited to the disclosed embodiments. The scope of the following claims is to be accorded the broadest interpretation so as to encompass all such modifications and equivalent structures and functions.

This application claims the benefit of Japanese Patent Application No. 2018-093275, filed May 14, 2018, which is hereby incorporated by reference herein in its entirety.

What is claimed is:

1. A device management system to communicate with a tenant management service for providing a website for receiving an instruction related to a tenant management from each customer and to manage a license status related to a service that a service providing system provides to a network device via a network, the device management system comprising:

one or more processors; and
a memory storing instructions that, when executed by the one or more processors, cause the device management system to perform operations including:
creating a first customer tenant in response to reception of a license registration event issued by the tenant management service, wherein the license registration event is issued by the tenant management service based on registration, in the tenant management service, of a tenant for a first customer in response to the instruction using the website and a license for a first network device belonging to the first customer, registering, in response to reception of a device registration event issued by the tenant management service and in a case where the first customer has agreed to processing that is necessary to use the service provided by the service providing system, first identification information about the first network device belonging to the first customer to the created first customer tenant, and issuing, in a case where the first identification information is registered to the first customer tenant, a first device registration completion event to the service providing system, wherein the device registration event is issued when the first identification information received from the first network device via the network is stored into the tenant for the first customer in the tenant management service.

2. The device management system according to claim 1, wherein executing the instructions further cause the device management system to perform operations including:

determining, in response to reception of a license deletion event issued by the tenant management service based on an operation by the first customer for cancellation of the tenant management service in the tenant management service, whether a license other than a license corresponding to the license deletion event remains in a plurality of licenses corresponding to the first customer tenant, deleting, in a case where it is determined that no license other than the license corresponding to the license deletion event remains in the plurality of licenses corresponding to the first customer tenant, registration information related to the first network device managed under the first customer tenant, deleting, in a case where the registration information related to the first network device managed under the first customer tenant is deleted, the first customer tenant, and issuing, in the case where the registration information related to the first network device managed under the first customer tenant is deleted, a device deletion event to the service providing system.

3. The device management system according to claim 1, wherein executing the instructions further cause the device management system to perform operations including:

directly receiving a registration request from a second network device belonging to a second customer in response to an operation on the second network device, creating, in response to the received registration request, a second customer tenant managing the second network device belonging to the second customer, registering, to the created second customer tenant, second identification information about the second network device that is a transmission source of the received registration request, notifying the tenant management service of a registration event to cause the tenant management service to register a new tenant for the second network device and the second identification information, and issuing a second device registration completion event to another system to provide one or more services for the second network device in response to a notifying reply, from the tenant management service, indicating completion.

4. The device management system according to claim 3, wherein executing the instructions further cause the device management system to perform operations including:

receiving a suspension request from the second network device belonging to the second customer, notifying the tenant management service of a license deletion request in response to reception of the suspension request, determining, in response to reception of a license deletion event issued by the tenant management service based on the license deletion request, whether a license other than a license corresponding to the license deletion event remains in a plurality of licenses corresponding to the second customer tenant, deleting, in a case where it is determined that no license other than the license corresponding to the license deletion event remains in the plurality of licenses corresponding to the second customer tenant, registration information related to the second network device managed under the second customer tenant, issuing, in a case where the registration information related to the second network device managed under the second customer tenant is deleted, a device deletion event to the another system, and deleting, in the case where the registration information related to the second network device managed under the second customer tenant is deleted, the second customer tenant.

5. A method for a device management system to communicate with a tenant management service for providing a website for receiving an instruction related to a tenant management from each customer and to manage a license status related to a service that a service providing system provides to a network device via a network, the method comprising:

creating a first customer tenant in response to reception of a license registration event issued by the tenant management service, wherein the license registration event is issued by the tenant management service based on registration, in the tenant management service, of a tenant for a first customer in response to the instruction using the website and a license for a first network device belonging to the first customer;

registering, in response to reception of a device registration event issued by the tenant management service and in a case where the first customer has agreed to processing that is necessary to use the service provided by the service providing system, first identification information about the first network device belonging to the first customer to the created first customer tenant; and issuing, in a case where the first identification information is registered to the first customer tenant, a first device registration completion event to the service providing system, wherein the device registration event is issued when the first identification information received from the first network device via the network is stored into the tenant for the first customer in the tenant management service.

* * * * *